(12) United States Patent
Srinivasan et al.

(10) Patent No.: US 6,930,817 B2
(45) Date of Patent: Aug. 16, 2005

(54) CONFIGURABLE GRATING BASED ON SURFACE RELIEF PATTERN FOR USE AS A VARIABLE OPTICAL ATTENUATOR

(75) Inventors: Uma Srinivasan, Mountain View, CA (US); Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 10/423,752

(22) Filed: Apr. 25, 2003

(65) Prior Publication Data

US 2004/0212869 A1 Oct. 28, 2004

(51) Int. Cl.⁷ .............................................. G02B 26/00
(52) U.S. Cl. ........................................................ 359/295
(58) Field of Search ................................ 359/295, 290, 359/291, 297, 315, 846

(56) References Cited

U.S. PATENT DOCUMENTS

| | | | |
|---|---|---|---|
| 3,942,048 A | | 3/1976 | Laude et al. |
| 4,115,747 A | | 9/1978 | Sato et al. |
| 4,327,966 A | | 5/1982 | Bloom |
| 4,494,826 A | | 1/1985 | Smith |
| 4,529,620 A | | 7/1985 | Glenn |
| 4,626,920 A | | 12/1986 | Glenn |
| 5,124,834 A | | 6/1992 | Cusano et al. |
| 5,459,610 A | | 10/1995 | Bloom et al. |
| 5,526,172 A | * | 6/1996 | Kanack ............... 359/291 |
| 5,661,592 A | | 8/1997 | Bornstein et al. |
| 5,677,783 A | | 10/1997 | Bloom et al. |
| 5,699,468 A | | 12/1997 | Farries et al. |
| 5,841,579 A | | 11/1998 | Bloom et al. |
| 5,867,301 A | | 2/1999 | Engle |
| 5,999,319 A | | 12/1999 | Castracane |
| 6,307,663 B1 | | 10/2001 | Kowarz |
| 6,363,202 B1 | | 3/2002 | Goodfellow |
| 6,389,190 B2 | | 5/2002 | Solgaard et al. |
| 6,421,179 B1 | | 7/2002 | Gutin et al. |
| 6,556,727 B2 | | 4/2003 | Minikata et al. |
| 2003/0025563 A1 | | 2/2003 | Christensen |

FOREIGN PATENT DOCUMENTS

| | | |
|---|---|---|
| EP | 0 434 139 A2 A3 | 6/1991 |
| WO | WO 02/091024 A2 | 11/2002 |

OTHER PUBLICATIONS

Brinker, W. et al., *Deformation Behavior of Thin Viscoelastic Layers Used in an Active–Matrix–Addressed Spatial Light Modulator*; Proceedings of the SPIE; SPIE, Bellingham, Va., U.S.; vol. 1018, Sep. 22, 1988, pp. 79–85; XP002042949, ISSN: 0277–786X; *p. 79–p. 80; Figures 1, 5, 9.

(Continued)

*Primary Examiner*—Hung Xuan Dang
*Assistant Examiner*—Tuyen Tra
(74) *Attorney, Agent, or Firm*—Fay, Sharpe, Fagan, Minnich & McKee, LLP

(57) ABSTRACT

A variable modulator assembly includes an active layer. A deformable layer is in operational contact to a first surface of the active layer, and an electrode configuration consisting of a plurality of electrodes is in operational contact to a second surface of the active layer. A controller is configured to selectively apply a variable signal to the selected electrodes of the electrode configuration. Application of the variable signal causes the deformable layer to reconfigure to an alternated shape having distinct peaks and valleys. The distance between the peaks and valleys being determined by the value of the applied variable signal.

In an optical modulating method, a variable modulator assembly is positioned to receive light at the deformable layer from a light source. Activation of an electrode configuration by the controller generates a variable signal, causing electrostatic charges to deform the deformable layer into a pattern corresponding to the activated electrodes.

32 Claims, 7 Drawing Sheets

OTHER PUBLICATIONS

N.K. Sheridon, et al., "The Optical Processing Capabilities of the Ruticon," SPIE vol. 128, *Effective Utilization of Optics in Radar Systems* (1977), pp. 244–252.

Kück, et al., "Deformable Micromirror Devices as Phase-Modulating High-Resolution Light Valves", *Sensors and Actuators A54*, (1996) p.p. 536–541.

Brown, et al., "Micromachined, Electrostatically-Actuated Optical Attenuators/Switches Fabricated by Fusion Bonding of Single–Crystal, Ultra–Thin Silicon Wafers", *ECS Proceedings*, vol. 99–35, to be published.

"Lightconnect Introduces First MEMS–Based Digital Variable Optical Attenuator Optimized for Open–Loop Control", Dec. 5, 2001, Newark, Calif., Press Releases, http://www.lightconnect.com/news/news_release120501b.shtml.

Sakarya, S., et al., *Technology of Reflective Membranes for Spatial Light Modulators; Sensors and Actuators A 97–98* (2002, pp. 468–472) 2002 Elsevier Science B.V.

Sakarya, S., et al., *Low–Cost Technological Approaches to Micromachined Spatial Light Modulators*, Proceedings of SPIE vol. 4825 (2002), pp. 264–271; 2002 SPIE—0277–786X/02.

Sakarya, S., et al., *Technology for Integrated Spatial Light Modulators Based on Reflective Membranes*, Proceedings of SPIE vol. 4493 (2002), pp. 21–28; 2002 SPIE—0277–786X/02.

Sakarya, S., et al., *Technology for Integrated Spatial Light Modulators Based on Viscoelastic Layers*, Laboratory of Electronic Instrumentation, Delft University of Technology, pp. 672–675.

Sakarya, S., et al., *Technology of Reflective Micromachined Pixelated Membranes for Use in Spatial Light Modulators*; Proceedings of the SeSens workshop, pp. 690–691, Dec. 01, 2000; ISBN:90–74561–24–3; STW–2000 09 26–02:112.

Vdovin, G., et al., Technology and Applications of Micromachined *Membrane Deformable Mirrors*; 0–7803–4953–9/98, 1998 IEEE, 2 pages.

Srinivasan, Uma, et al., *Electrostrictive Elastomer Based Diffractive Modulator for Use as a Variable Optical Attenuator*; D vice Hardware Laboratory, Palo Alto Res arch Center Incorporated, 2 pages.

* cited by examiner

CONFIGURABLE GRATING BASED ON SURFACE RELIEF PATTERN FOR USE AS A VARIABLE OPTICAL ATTENUATOR

BACKGROUND OF THE INVENTION

The present application relates to optical grating assemblies, and more particularly to an assembly and method for a configurable grating assembly based on a surface relief pattern for use as a variable optical attenuator.

Fiber networks normally employ point-to-point links, which are static, where most of the intelligence, provisioning and grooming functions are provided by electronics at the ends of each link. As network architectures grow in size and complexity, however, this approach to building and maintaining network infrastructure will not satisfy the requirements of reliability, efficiency and cost-effectiveness required by service providers. Therefore, the industry is moving to optically reconfigurable networks where optical paths, wavelengths and data rates are dynamically changed to satisfy network system requirements, such as provisioning new wavelengths, balancing data loads and restoring after-service malfunctions.

Variable optical attenuators (VOA) are used to permit dynamic control of optical power levels throughout a network. As an example of their usefulness, if a network is providing a wavelength route that is approximately 60 km in length, at a predetermined power, and the network attempts to change the wavelength route to one which is 30 km, it would be expected that excessive power would be delivered to the end receivers of the 30 km route, potentially resulting in a malfunction in the network. A VOA will lower the power output of the switched wavelength to permit a signal of acceptable strength at the end receiver. Existing VOAs implement mechanical systems to attenuate the light. In one design, attenuation is accomplished by moving two separate optical fibers, and in another by inserting a motor-driven blade or filter in the light path. While these devices have acceptable optical performance, tradeoffs include slow speed, undesirable noise and a potential for mechanical failure.

It has been appreciated by the inventors, that systems now exist which describe structures incorporating deformed/deformable structures for light modulation.

Sheridon, in an article entitled, "The Ruticon Family of Erasable Image Recording Devices," *IEEE Transactions on Electron Devices*, ED-19, No. 9, September 1972, pp. 1003–1010, teaches Ruticons are solid-state cyclic image recording devices. They have a layered structure consisting of a conductive transparent substrate, a thin photoconductive layer, a thin deformable elastomer layer, and a deformable electrode such as a conductive liquid, a conductive gas, or a thin flexible metal layer. When an electric field is placed between the conductive substrate and the deformable electrode the elastomer will deform into a surface relief pattern corresponding to the light-intensity distribution of an image focused on the photoconductor. Light modulated by the deformation of the elastomer surface can in turn be converted to an intensity distribution similar to the original image by means of simple optics. Ruticons are expected to find initial applications in image intensification, holographic recording, and optical buffer storage.

Further, in "The Optical Processing Capabilities of the Ruticon," SPIE Vol. 128, *Effective Utilization of Optics in Radar Systems* (1977), pp. 244–252, Sheridon, et al. teach the Ruticon is a solid state optical image modulator consisting of a metallized elastomer layer coated on a photoconductor layer. An electrical field is placed between the metal surface and a transparent conductive substrate. An input image, such as from a CRT or a laser, causes a change in the distribution of electrical fields across the device, and the mechanical forces associated with these electrical fields cause the metallized elastomer surface to deform into an image pattern. Laser light reflected from this surface is phase modulated with the input image information and this modulated light may be used as the input to a coherent optical processing system.

Other examples of such designs include two patents to Glenn, U.S. Pat. Nos. 4,529,620 and 4,626,920. These patents disclose the generation of video imagery through the use of storing a charge pattern representative of a video frame. The system employs a solid state light modulator structure having an array of space charge storage electrodes. An elastomer layer is disposed on the semiconductor device, over the array of charged storage electrodes. At least one conductive layer is disposed over the elastomer layer. The semiconductor device is responsive to the input video signal to selectively apply voltage between the charged storage electrodes and the one conductive layer to cause deformations of the conductive layer and the elastomer layer. A plastic pellicle layer may be disposed between the elastomer layer and the at least one conductive layer. These patents are hereby incorporated by reference in their entirety.

Laude et al., U.S. Pat. No. 3,942,048, is directed to an optical grating assembly having a piezoelectric substrate, which supports, on two opposite faces thereof, respective metallic layers. One of these faces of the substrate also carries a grating. Application of a variable voltage between the metal layers sets up an electric field of variable strength in the substrate, resulting in the pitch of the grating being variable due to the piezoelectric nature of the substrate. Laude et al. '048 is incorporated by reference in its entirety.

Bloom et al., U.S. Pat. No. 5,459,610, describes a modulator for modulating incident rays of light. The modulator includes a plurality of equally spaced apart beam elements, each of which includes a light-reflective planar surface. The elements are arranged parallel to each other with their light reflective surfaces parallel to each other. Means are provided for supporting the beam elements in relation to one another. Additional means are provided to the beam elements relative to one another so that the beams move between a first configuration wherein the modulator acts to reflect the incident rays of light as a plane mirror, and a second configuration wherein the modulator diffracts the incident rays of light as they are reflected. Bloom et al. '610 is hereby incorporated by reference in its entirety.

An article by Kück et al., entitled "Deformable Micromirror Devices as Phase-Modulating High-Resolution Light Valves," *Sensors and Actuators* A 54 (1996) 536–541, reports on two different technologies for deformable micromirror devices as phase-modulating light valves for high-resolution optical applications. Disclosed is a fabricated light valve with CMOS addressing and viscoelastic layer deformable mirrors. On top of a substrate carrying pixel electrodes is the viscoelastic control layer covered with a mirror electrode. A bias voltage of typically 250 V is applied between the pixel electrodes and the mirror electrode, whereby the reflective viscoelastic layer behaves like a plane mirror. On applying a single voltage of about ±15 V to neighboring pixel electrodes, the viscoelastic mirror is deformed sinusoidally forming a phase grating corresponding to the active pixels. In order to avoid the imprinting of an image pattern into the viscoelastic layer, the polarity of the signal voltage is changed in subsequent image cycles. Kück et al. is hereby incorporated by reference in its entirety.

The foregoing material does not address the noted shortcomings, and further fails to disclose a VOA, which also permits for analog control and for specific configurations.

BRIEF DESCRIPTION OF THE INVENTION

A variable modulator assembly includes an active layer having a first and second surface. A deformable layer is in operational contact to the first surface of the active layer, and an electrode configuration consisting of a plurality of electrodes is in operational contact to the second surface of the active layer. A controller is configured to selectively apply a variable signal to the selected electrodes of the electrode configuration. Application of the variable signal causes the deformable layer to reconfigure to an alternated shape having distinct peaks and valleys. The distance between the peaks and valleys being determined by the value of the applied variable signal.

In accordance with another aspect of the present invention, provided is an optical modulating method, including positioning a variable modulator assembly to receive light from a light source. The variable modulator assembly includes a deformable layer in operational contact to a first surface of the active layer of the variable modulator. It is the deformable layer, which is located to receive the light from the light source. Deformation of the deformable layer is controlled by selective activation of an electrode configuration in operational contact to a second surface of the active layer. The activation of the electrode configuration is controlled by a controller. In the process, the controller generates a variable signal and transmits the variable signal to selected electrodes of the electrode configuration, wherein activation of the electrodes causes electrostatic charges, which deform the deformable layer into a pattern corresponding to the activated electrodes.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1A:
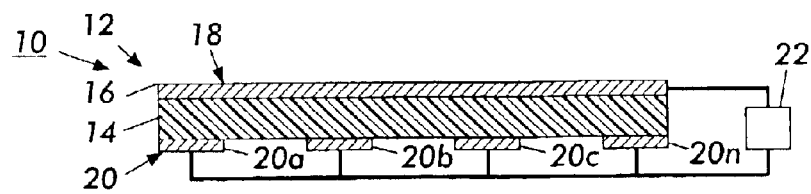
FIG. 1A is a cross-sectional view of a variable modulator system according to the teachings of the present application.

Referring to FIG. 1A, illustrated is a simplified schematic diagram of a variable modulator assembly system 10, which may be a variable optical attenuator, according to the concepts of the present application. Variable modulator 12 is constructed with an active layer 14, having an upper surface, which is in operational contact with a deformable compliant layer 16 having a reflective surface 18. A bottom surface of the active layer 14 has, in operational contact, an electrode configuration 20, comprising a plurality of electrodes 20a–20n. In one embodiment, the reflective surface may be a polished surface of the deformable layer 16, or may be a separate blanket or patterned layer made of reflective material including but not limited to a variety of metals. In one embodiment, deformable layer 16 is directly attached onto an upper surface of the active layer 14. In other embodiments an interposed protective layer (not shown) is provided. Deformable layer 16 is conductive as well as reflective.

The electrode configuration may be patterned using known photolithography techniques to achieve a desired surface relief pattern, which will correspond to the system's grating structure. Active layer 14 may be elastomer or electrostrictive material, such as Poly-di-methyl-siloxane (PDMS) formed by known spin-coating or other manufacturing techniques. Piezo-electric materials like poly vinylidene fluoride may also be considered, provided the frequency of operation is carefully chosen.

Reflective surface 18 of deformable layer 16 is designed to be reflective and act as a mirror when no voltage is applied to variable modulator 12. In this embodiment, the deformable layer 16 is grounded, and electrode configuration 20 will be supplied with a bias and/or variable voltage from a voltage signal generator/controller 22.

Voltage generator/controller 22 can be designed to address each electrode individually, or to address groups of electrodes in common. In either arrangement, controller 22 is able to provide application of a variable voltage to the electrodes.

Figure 1B:
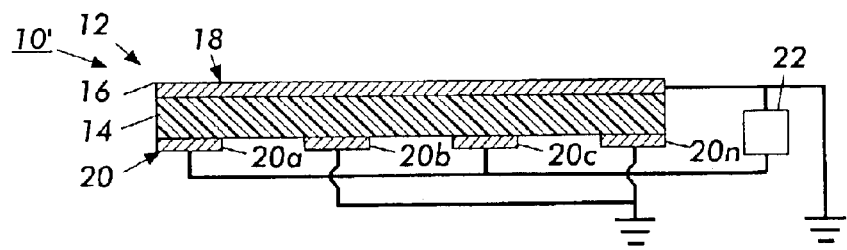
FIG. 1B is a cross-sectional view of an alternative arrangement of the optical modulator of FIG. 1A, with an interdigitated electrode operation.

FIG. 1B depicts a variable modulator assembly system 10' similar to FIG. 1A. However, in this design, alternating electrodes (e.g., 20b, 20n) are set to ground, which operate the electrodes in an interdigitating arrangement.

Figure 1C:
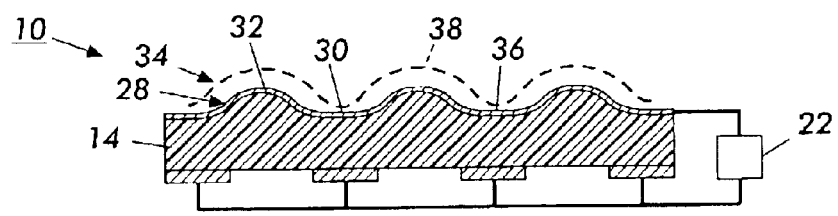
FIG. 1C depicts the optical modulator of the present application showing various deformations of an upper deformable layer.

As shown in FIG. 1C, application of the variable voltage signal from controller 22 creates an electrostatic (capacitive force) action causing the active layer 14 and the deformable layer 16 to wrinkle in accordance with the electrode configuration geometry—in this embodiment creating a variable sinusoidal grating 28. The distance from the valley grating 30 to a peak 32 of the grating surface is defined in this example as a value x. Dotted-line 34 illustrates a situation where signal generator/controller 22 has increased the voltage supplied to the patterned electrodes of electrode configuration 20. In this situation, the valley 36 to peak 38 difference is x+a. Controller 22 may also decrease the voltage applied to electrodes of electrode configuration 20. In this situation, the valley to peak difference is decreased.

FIGS. 1A and 1C illustrate that deformable layer 16 will form into a surface relief pattern dependent upon the patterned electrode configuration 20, and as a varying signal is applied to the electrode configuration 20, the height of the peaks formed in the deformable layer will vary.

When no variable voltage is supplied from controller 22, reflective surface 18 acts as a mirror, and displacement of an impinging light is at substantially zero displacement. As the voltage to electrode configuration 20 is increased by the controller 22, displacement or diffraction of the light is increased. When the surface relief pattern is displaced by a quarter wavelength, the light reflected from the two surfaces is 180° out of phase, and destructive interference occurs. At this point, the light is totally diffracted, and none is reflected. Therefore, by the described design, analog control of the light, e.g., from a zero state of displacement to a quarter wavelength displacement, is achieved by application of the variable voltage from controller 22.

Figure 1D:
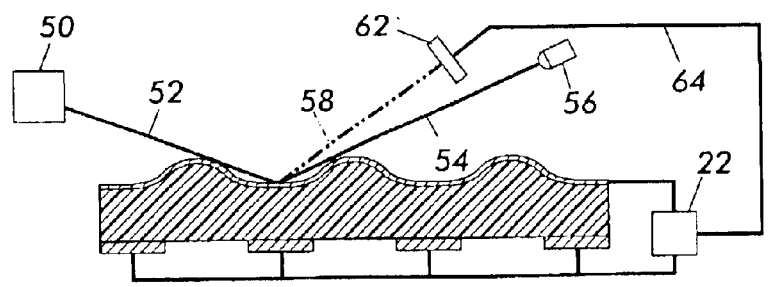
FIG. 1D depicts the optical modulator having a light beam from a light source impinging upon a deformed surface.

This analog control is refined by monitoring of at least one of the diffracted order wavelengths such as a $1^{st}$ order diffracted wavelength. For example, initially, the $0^{th}$ order (zero displacement) and $1^{st}$ order (quarter length displacement) diffraction intensity as a function of voltage is calibrated and this information used to control the intensity of the $0^{th}$ order by monitoring the $1^{st}$ order diffraction. In one implementation, a light source 50 of FIG. 1D emits a light beam 52. A reflected light portion 54 is transmitted to an element 56, such as a fiber, receiver, or other mechanism. A diffracted light wave 58, is sensed by a sensor 62. The sensor 62 may be substantially transparent to the wavelength of the diffracted light 58 for situations where additional testing or use of the diffracted light wave 58 is to be undertaken. Output from the sensor 62 is provided via a feedback line 64 to controller 22. Feedback circuitry included in controller 22 uses the signal obtained from the $1^{st}$ order diffracted wavelength to control the voltage applied to electrode configuration 20. This design permits for a non-destructive monitoring and controlling of the $0^{th}$ order (zero displaced waveform). Hence, in this example the deformation of deformable layer 16, with reflective surface 18, is controlled from the $0^{th}$ order (zero displacement) to the $1^{st}$ order (e.g., quarter wavelength displacement) by an analog control mechanism. By use of this analog control, the intensity output value for the $0^{th}$ order is closely controllable. For example, when no variable voltage is applied (so the surface is essentially a mirror) the intensity output of a beam of light to component 56 may be substantially 100 percent of the light beam 52. If the desired output requirements change wherein only 75 percent intensity in the $0^{th}$ order is needed, the amount of voltage supplied to the electrode configuration 20 is undertaken to increase the deformation such that 25 percent of the intensity goes into higher order diffracted wavelengths (e.g., 58). More generally, the present design permits analog control from a first displacement to a second displacement.

Figure 1E:
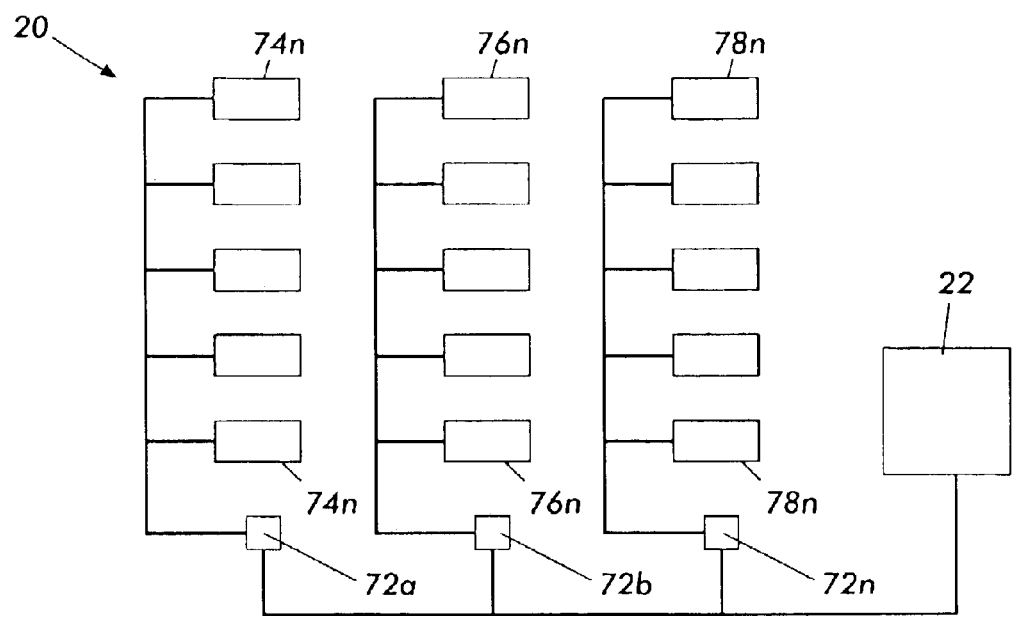
FIG. 1E shows a block view of the electrode configuration in a line configuration switching arrangement.

FIG. 1E illustrates the variable signal generated by controller 22 does not have to be supplied to all of the electrodes of electrode configuration 20. Rather, a more refined control is obtainable. In one embodiment, switches 72a–72n maybe used to control individual lines of electrodes 74a–74n, 76a–76n, 78a–78n. Controller 22 will issue a signal, turning on one or more of switches 72a–72n. Switches 72a–72n may be high voltage TFT, CMOS or other appropriate switching devices.

Figure 1F:
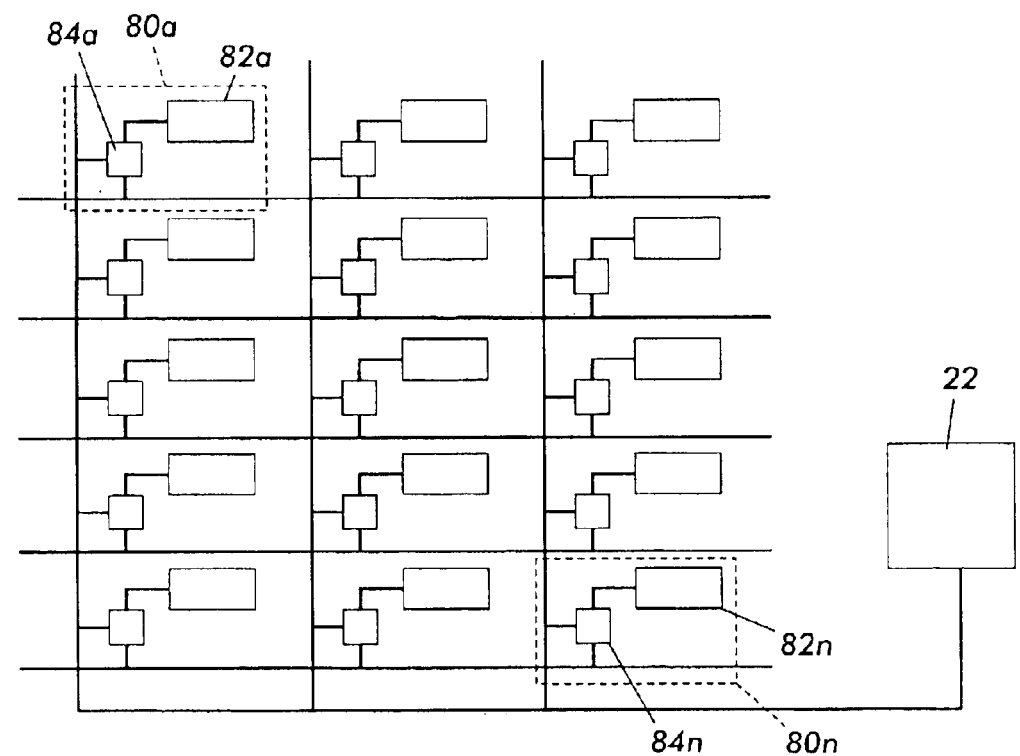
FIG. 1F shows the electrode configuration in a pixel-by-pixel switching arrangement.

A further refinement in the control of electrode configuration 20 is shown in FIG. 1F. Herein, each electrode pixel 80a–80n of the electrode configuration will include an electrode 82a–82n, and an associated switch mechanism 84a–84n. By this design, each pixel may be individually addressed by controller 22. In one embodiment, the switch mechanism 84a–84n may be TFT, CMOS or other appropriate switching devices.

Figure 1G:
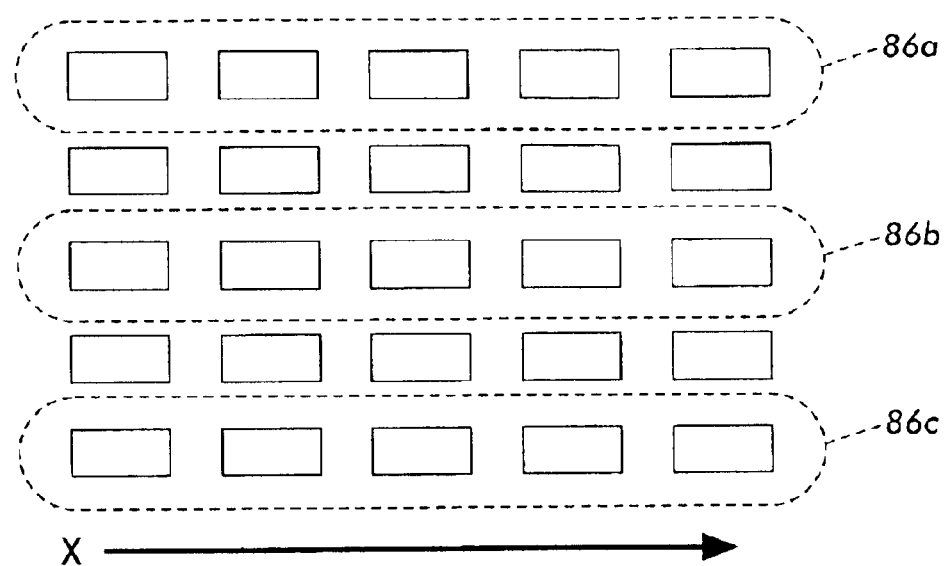
FIG. 1G shows the pixel-by-pixel arrangement wherein deformation will be in the x-axis.
Figure 1H:
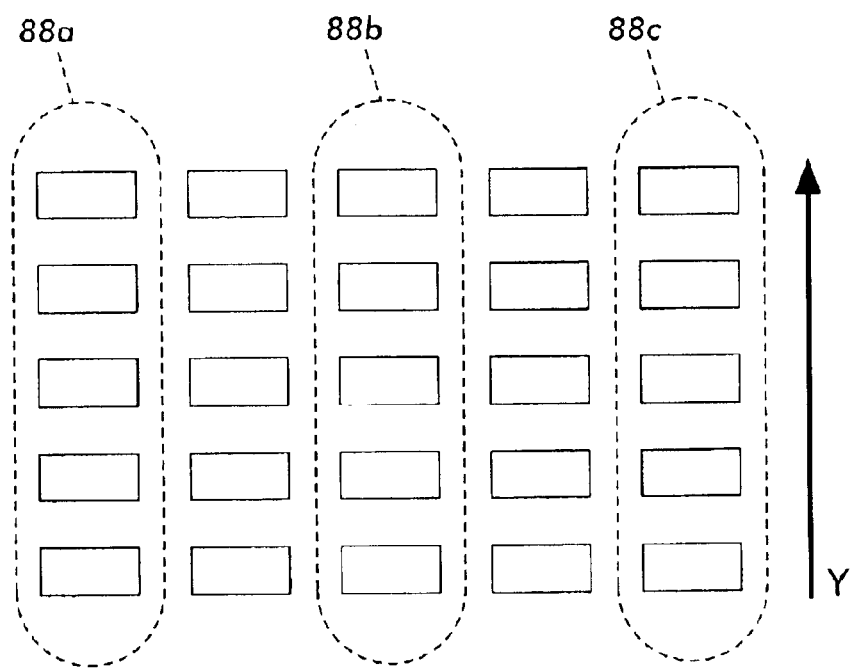
FIG. 1H illustrates the pixel control mechanism with a selection wherein the deformation is in the y-axis.

It is to be understood that when using one switch for each individual line of electrodes, spacing of the active electrodes can be controlled, and this permits the use of the present design to filter different light wavelengths. Further, when a line and individual switching, such as with TFT or CMOS switches are used, the generated grating can be oriented in distinct directions by activating the appropriate pixel combinations. For example, using the design of FIG. 1F, when the grating structure is oriented in the x-axis, the $1^{st}$ order diffraction pattern will be in the x-axis of the diffraction plane (i.e., in FIG. 1G when pixels in groupings 86a, 86b, 86c are selected), and when the grating structure is oriented in the y-axis, the $1^{st}$ order diffraction pattern will be in the y-axis of the diffraction plane (i.e., in FIG. 1H when pixels in groups 88a, 88b, 88c are selected). Operation of the variable optical attenuator, modulator, as a variable optical attenuation of the present application may be used minimize overlap of signals of a $1^{st}$ order diffraction signal with adjacent channels.

Figure 2A:
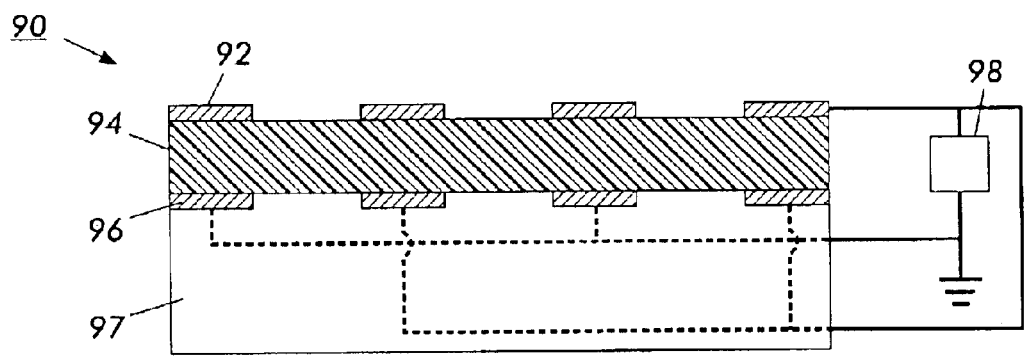
FIG. 2A is another embodiment of an optical modulator according to the present application wherein the deformable surface is a patterned interdigitated surface layer.

Turning to FIG. 2A, set forth is another embodiment of a variable modulator (variable optical attenuator) 90 according to the present application. Particularly, in this embodiment, blanket deformable layer (i.e., electrode) 16 of FIG. 1A is replaced with a patterned interdigitated deformable electrode layer 92. The patterning of the deformable electrode 92 may be accomplished by any known method, using any of a number of materials. This deformable electrode pattern may be transferred to active layer 94 by a variety of transfer operations, including a laser liftoff process. A preferred version of accomplishing the laser lift-off process is to use a low power, plasma-treated PDMS layer so that there is a thin layer of surface oxide and quartz/metal/amorphous silicon for the laser liftoff.

Figure 2B:
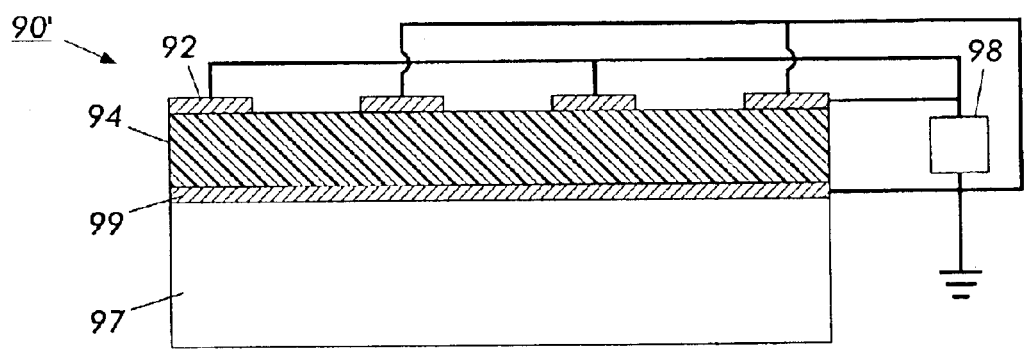
FIG. 2B depicts an arrangement similar to 2A, with the electrodes on a top surface.

FIG. 2B depicts an alternative variable modulator 90' according to the present application. In this embodiment, the top electrodes 92 are selectively connected for activation to a voltage signal generator/controller 98, while others are placed at common. This design provides for operation in an interdigitated mode.

In the embodiments of FIGS. 2A–2B, and other embodiments disclosed herein, bottom electrode configuration 96 maybe placed at common/grounded, and the voltage applied to the patterned deformable interdigitated electrode layer 92. The modulator may be built on any of a number of different substrates, such as a glass substrate 97. A potential benefit of this embodiment is that the device efficiency will not be limited by the stiffness of the blanket top electrode as in FIG. 1A, when voltage signal generator/controller 98 applies a variable voltage to variable modulator 90.

Figure 3:
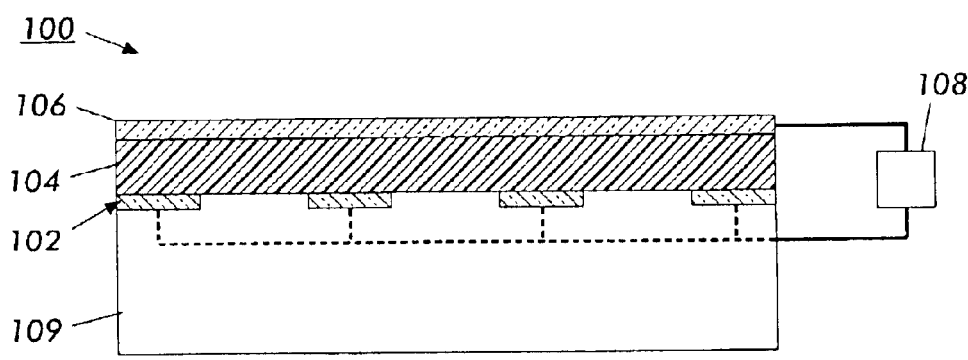
FIG. 3 illustrates an embodiment wherein the upper deformable layer and electrode configuration are of a transparent material.

Turning to FIG. 3, shown is another embodiment of a variable modulator 100 according to the teachings of the present application. In this embodiment, a lower-patterned electrode 102 is formed from a transparent material substantially transparent at the wavelengths of light which will impinge at the modulator 100. The active layer 104, similar to previous embodiments, may be a spin-coated elastomer or other appropriate material. A conductive transparent blanket layer 106 is employed as the deformable electrode layer, and glass or other appropriate material is used as a substrate 109. It is to be appreciated, however, that layer 106 may also employ a patterned deformable layer. There may be a loss, dependant upon the material and wavelength used in this embodiment.

An advantage of the device shown in FIG. 3 is that by using the conductive polymer, higher strain levels are possible than those used with a metal layer such as described in FIG. 1. In this embodiment, operation includes grounding the top transparent blanket electrode 106, and applying a voltage, via a voltage signal generator/controller 108, to the bottom transparent, interdigitated electrodes 102. The variable modulator 100 may be designed with its configurable transmissive grating, in one embodiment as a sinusoidal grating. The method of operating variable modulator 100 is similar to that previously described, except that the operation is in transmission mode. An advantage of this embodiment is that the top layer may not be reflective. This helps in achieving a top electrode layer with a higher compliance, which translates into a device with improved efficiency.

Figure 4A:
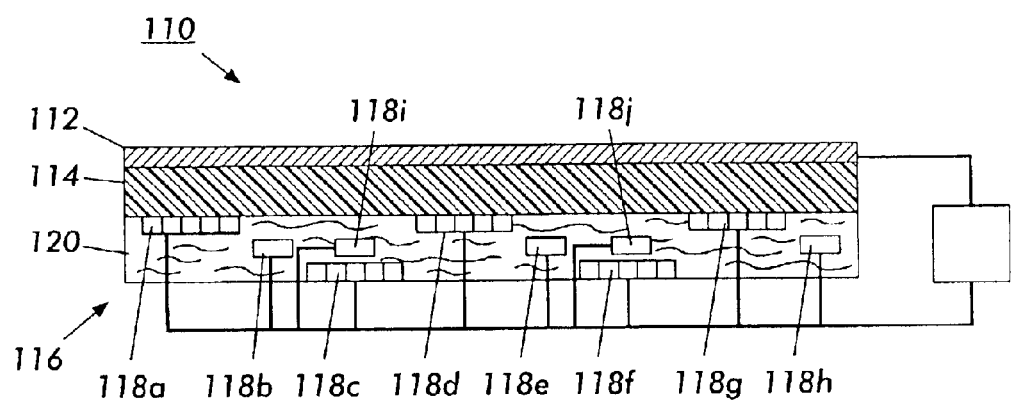
FIG. 4A depicts an embodiment of a variable modulator wherein the electrode configuration is a multi-layered configuration.

Turning to FIG. 4A, illustrated is a further embodiment of a variable modulator 110 according to the teachings of the present application. Deformable surface layer 112 is shown as a blanket electrode. However, it is to be appreciated this embodiment may also employ an interdigitated patterned electrode as the deformable layer. The deformable electrode layer 112 is carried on the active layer 114 as in previous embodiments.

Figure 4B:
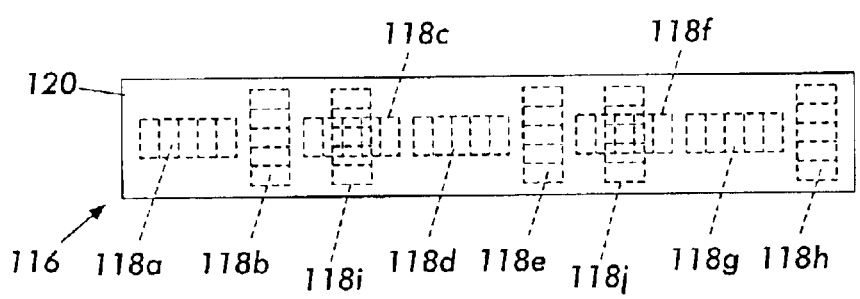
FIG. 4B shows a top view of the electrode configuration of FIG. 4A.

The lower electrode configuration 116 may be a multi-layered electrode configuration having a plurality of electrodes 118a–118j in a layered design where the electrode configuration in a layer may be placed at angles to electrode configuration in an adjacent layer. This is illustrated more clearly in the top cross-sectional view of FIG. 4B. A dielectric or other insulating material 120 is used to separate the electrodes from each other. A voltage is selectively applied to electrodes 118a–118j, via voltage signal generator/controller 122.

The multi-layered concept permits the generation of a complex diffraction grating with different electrode fields being used for different patterns.

Using this configuration, it is possible to switch, diffracted light, such as the $1^{st}$ order diffracted light, to different points in a plane. Thus, when the grating structure is oriented in the x-axis, the $1^{st}$ order diffraction pattern will be in the x-axis of the diffraction plane, and when the grating structure is oriented in the y-axis, the $1^{st}$ order diffraction pattern will be in the y-axis of the diffraction plane. Operation of variable modulator 110 in this embodiment may be used to minimize the overlap of signals in $1^{st}$ order diffracted signals with an adjacent channel. It is particularly noted that electrodes may be located in a stacked relationship to each other, as is shown by electrodes 118c, 118i and electrodes 118f, 118j. In this design, the same area of the deformable layer 112 may be manipulated in different orientations.

Figure 5:
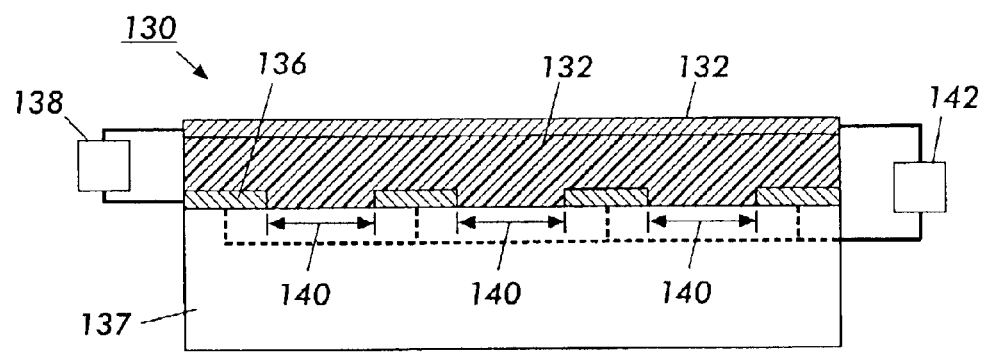
FIG. 5 depicts another embodiment of an optical modulator or a substrate wherein the substrate is deformable such that it alters the spacing between the electrodes of the electrode configuration.

Turning to FIG. 5, depicted is a further embodiment of a variable modulator 130 according to the concepts of the present application. In this embodiment, active layer 132, which carries the deformable layer 134, incorporates electrode configuration 136 (which is intended to include each electrode of the system). This arrangement is fabricated on a flexible, compliant structure substrate 137, which permits the grating pitch to be varied. In one embodiment, the flexible substrate 137 may be a piezoelectric material. A variable voltage source 138 is connected between electrode configuration 136 and deformable layer 134, each of which are electrically conductive layers. When energized by an energy source 138, the piezoelectric substrate 137 will expand, altering the distance 140 between the electrodes of the electrode configuration 136. Particularly, if the space between two adjacent electrodes is d, then it is possible to change the spacing from d+Δd to d−Δd, as well as 2d+Δd to 2d−Δd, and so on, wherein Δd is the displacement change that can be created due to the flexible compliant material of substrate 137. Using this technique, it is possible to obtain a higher wavelength resolution. Other advantages include the ability to filter nearby wavelengths, and for scanning and positioning applications. In addition to a material, which requires electrical operation, the flexible substrate 137 may be a silicone elastomer which is able to be mechanically deformed. Controller 142, which is similar to controller 22, permits for the analog control of variable modulator 130. While variable voltage source 138 and controller 142 are shown in this figure as separate components, it is to be understood that they could be provided as a single unit. It is to be understood that previous and following modulators are shown without a substrate, and is done for clarity. However, for actual manufacture, these modulators will be formed on a substrate such as substrate 137 or a substrate formed from glass or other appropriate material.

Figure 6A:
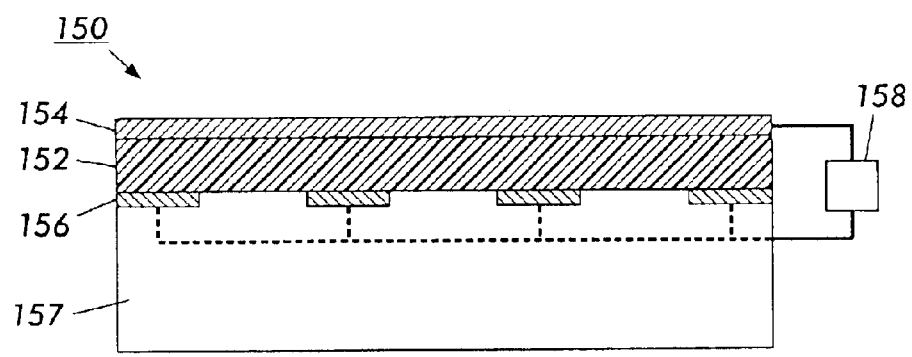
FIG. 6A illustrates yet another embodiment of a variable modulator wherein the active layer is a thermoplastic settable material.
Figure 6B:
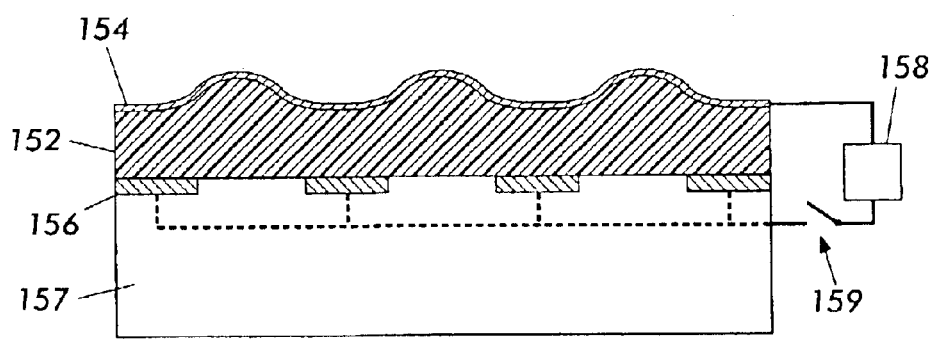
FIG. 6B depicts the optical modulator of FIG. 6A in a deformed state wherein the thermoplastic active layer has been reformed and the controller voltage removed.

Turning to FIG. 6A, set forth is a variable modulator 150 according to still another embodiment of the present application. In this design, active layer 152, carrying deformable layer 154 and connected to electrode configuration 156, is formed of a thermoplastic material. This configuration is carried on a substrate 157, which may be glass or other appropriate material. Use of the thermoplastic material permits for a bistable device. The thermoplastic layer 152 is heated above its setting point, to enter into a formable state. While in the formable state, a relief pattern generated in accordance with the electrode configuration 156 and operation of controller 158 forms, for example as shown in FIG. 6B, deformed upper layer 154. Thereafter, the temperature of the thermoplastic material 152 is lowered to below its set point, and thereafter the voltage supplied by controller 158 may be removed (e.g., switch 159 is opened). The deformed upper layer 154 maintains its configuration due to the thermoplastic material having set into that structure.

When it is desired to alter the deformed upper layer structure 154, the thermoplastic layer 152 is reheated and a new structure form may be created.

Figure 7:
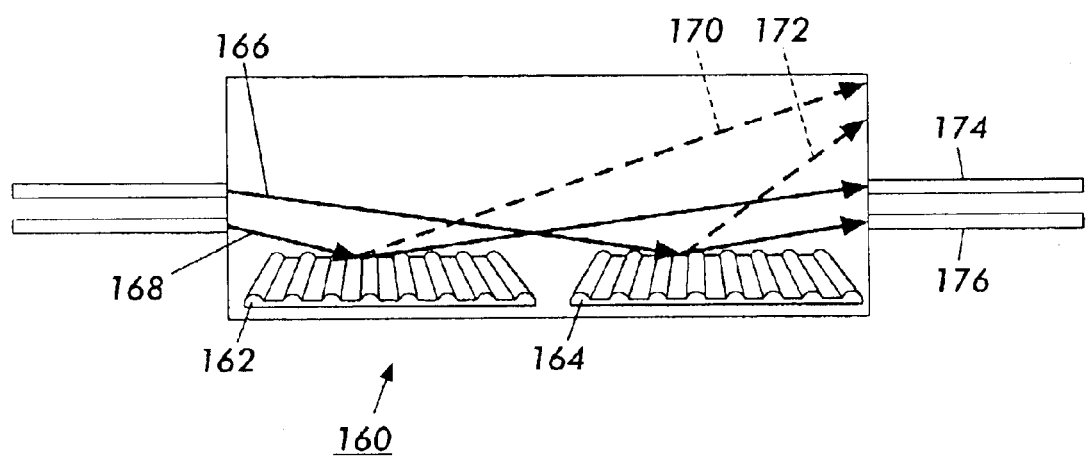
FIG. 7 shows a two-channel variable modulator, such as a variable optical attenuator.

Turning to FIG. 7, depicted is a two-channel variable optical actuator 160, including a first variable modulator 162, and a second variable modulator 164 (shown simply in surface relief). Solid lines 166 and 168 show two (i.e., two channels) $0^{th}$ order waveforms, and the dashed lines 170, 172 show two higher order diffracted waveforms. It is noted the solid lines 166, 168 are shown as being transmitted to fibers 174, 176 for further transmission in a system. Previously described embodiments may be used in such two-channel systems to improve system operation.

It is to be appreciated that features of the foregoing embodiments maybe combined with features of other embodiments described herein, and although components may be numbered differently, they may include characteristics of similar components found in the various embodiments.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A variable optical modulator assembly comprising:
   an active layer having a first and a second surface;
   a deformable layer in operational contact to the first surface of the active layer;
   an electrode configuration consisting of a plurality of electrodes in operational contact to the second surface of the active layer; and
   a controller configured to selectively apply a variable signal to selected electrodes of the electrode configuration, wherein application of the variable signal causes the deformable layer to reconfigure to an altered shape having distinct peaks and valleys, the distance between the peaks and valleys being determined by the value of the applied variable signal, the deformable layer acting as a configurable diffraction grating used for controlling an optical output intensity.

2. The assembly according to claim 1, wherein the controller provides for an analog control of light delivered to the deformable surface.

3. The assembly according to claim 1, wherein the active layer is one of an electrostrictive or elastomer material.

4. The assembly according to claim 1, wherein the active layer, deformable layer, electrode configuration and controller are configured to operate as a variable optical modulator.

5. The assembly according to claim 1, wherein the active layer, deformable layer, electrode configuration and controller operate as one of a filter or scanner.

6. The assembly according to claim 1, wherein the deformable layer is a blanket electrode.

7. The assembly according to claim 1, wherein the deformable layer is a patterned interdigitated electrode surface.

8. The assembly according to claim 1, wherein the electrode configuration is formed of interdigitated electrodes.

9. The assembly according to claim 1, wherein the electrode configuration is designed to generate a sinusoidal relief pattern when activation of the selected electrodes occurs.

10. The assembly according to claim 1, wherein the electrode configuration and the deformable layer are each formed from a transparent material.

11. The assembly according to claim 1 further including the electrode configuration being a first electrode configuration with the plurality of electrodes positioned to cause deformation of the deformable layer in a first direction.

12. The assembly according to claim 11 further including a second electrode configuration with the plurality of electrodes positioned to cause deformation of the deformable layer in a second direction.

13. The assembly according to claim 11, wherein the electrode configuration is a multi-layer arrangement.

14. The assembly according to claim 1, wherein the substrate is a flexibly alterable substrate, and altering the area of the substrate alters a distance between the electrodes resulting in a changed pitch of the deformable surface when deformed.

15. The assembly according to claim 1 further including at least one of a TFT or CMOS for each individual electrode.

16. The assembly according to claim 1 further including at least one of a TFT or CMOS for each pixel electrode.

17. The assembly according to claim 1, wherein the deformed deformable layer forms an optical grating structure.

18. The assembly according to claim 1, wherein the active layer is a thermoplastic material.

19. An optical modulating method comprising:
    positioning a variable modulator assembly to receive light from a light source, wherein a deformable layer is in operational contact to a first surface of an active layer, and deformation of the deformable layer is controlled by selective activation of an electrode configuration in operational contact to a second surface of the active layer, the activation of the electrode configuration controlled by a controller;
    generating a variable signal from the controller; and
    transmitting the variable signal to selected electrodes of the electrode configuration, wherein activation of the electrodes creates electrostatic charges which deform the deformable layer into a diffraction grating having a pattern corresponding to the activated electrodes for controlling an output intensity.

20. The method according to claim 19 further including:
    grounding at least portions of the deformable layer.

21. The method according to claim 19, wherein the electrode configuration and the transmitting of the variable signal to selected electrodes of the electrode configuration results in the deformable layer deforming into a sinusoidal relief pattern having a plurality of peaks and valleys.

22. The method according to claim 21 further including:
    varying the variable signal wherein the distance between the peaks and valleys change in correspondence to changing of the variable signal.

23. The method according to claim 22 further including:
    emitting light from a light source to the deformable surface; and
    providing analog control of the intensity of emitted light reflected from the deformable layer, by varying the output of the controller.

24. The method according to claim 19, wherein the deformation of the deformable surface is in a first direction.

25. The method according to claim 24, wherein the electrode configuration is a first electrode configuration and deformation of the deformable layer is in a first direction, and the variable modulator assembly includes a second electrode configuration, wherein the second electrode configuration, when activated deforms the deformable layer in a second direction.

26. The method according to claim 19, wherein the active layer is a thermoplastic material.

27. The method according to claim 26, further including:
    heating the thermoplastic material above a set state into a formable state;
    maintaining the thermoplastic material in the formable state while the transmitting step is performed;
    moving the thermoplastic material to the set state while the transmitting step is maintained; and
    ending the transmitting step, wherein the deformation of the deformable layer is maintained.

28. The method according to claim 27, including heating the thermoplastic material back to the formable state.

29. The method according to claim 19, wherein the analog control further includes:

calibrating diffraction intensity as a function of voltage of a 0th order diffraction signal and a $1^{st}$ order diffraction signal;

monitoring the 1st order diffraction signal based on the calibrated data;

feeding back a value of the monitored 1st order diffraction signal to the variable signal generator; and altering the variable signal generated and transmitted to the electrode configuration based on the feedback 1st order diffraction value.

30. The method according to claim 29, wherein the monitoring of the 1st order diffraction signal is achieved by use of transparent sensors arranged to have the 1st order diffraction signals pass there through.

31. The method according to claim 19, wherein the analog control further includes:

calibrating diffraction intensity as a function of voltage of a 0th order diffraction signal and the 1st order diffraction signals;

monitoring the 0th order diffraction signal based on the calibrated data;

feeding back a value of the monitored 0th order diffraction signal to the variable signal generator; and altering the variable signal generated and transmitted to the electrode configuration based on the feedback $0^{th}$ order diffraction value.

32. The method according to claim 31, wherein the monitoring of the 0th order diffraction signal is achieved by use of transparent sensors arranged to have the 0th order diffraction signals pass there through.

* * * * *